Figure 1:
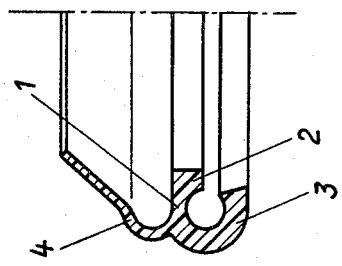

United States Patent
Chollet

[11] 3,944,105
[45] Mar. 16, 1976

[54] FLEXIBLE ANNULAR JOINT

[75] Inventor: Albert Chollet, Vevery, Switzerland

[73] Assignee: Etablissement Studia Technica, Vaduz, Liechtenstein

[22] Filed: July 29, 1974

[21] Appl. No.: 492,914

[30] Foreign Application Priority Data
July 31, 1973 Switzerland.................. 11151/73

[52] U.S. Cl................................... 220/4 E; 220/80
[51] Int. Cl.²...................... B65D 7/12; B65D 25/20
[58] Field of Search............... 220/4 E, 85 K, 80

[56] References Cited
UNITED STATES PATENTS
| | | | |
|---|---|---|---|
| 239,225 | 3/1881 | Claussen | 220/4 E |
| 1,921,015 | 8/1933 | Young | 220/4 E |
| 2,582,072 | 1/1952 | Schwinn | 220/4 E |
| 2,709,534 | 5/1955 | Johnson | 220/4 E |

FOREIGN PATENTS OR APPLICATIONS
| | | | |
|---|---|---|---|
| 1,004,671 | 9/1965 | United Kingdom | 220/4 E |
| 327,667 | 2/1958 | Switzerland | 220/75 |

*Primary Examiner*—George E. Lowrance
*Attorney, Agent, or Firm*—Haseltine, Lake & Waters

[57] ABSTRACT

Base and cover members of a vacuum filter having walls each terminating with an annular bead are sealably joined together by a flexible annular joint. The joint has a median part defining, with an inner flange and a first rounded outer lip, an annular cavity in which the bead of the base member is tightly gripped. A second thinner and more flexible rounded outer lip fits over the bead of the cover member and has a terminal skirt portion which resiliently bears against its wall. The cover member can be removed by outwardly bending the second lip while the joint remains fitted on the base member.

1 Claim, 2 Drawing Figures

FLEXIBLE ANNULAR JOINT

The invention relates to flexible annular joints for use in sealably joining together generally round members each having a wall terminating with an opening provided with an annular bead, the two beads defining superimposable surfaces forming a joining plane.

Such members may for example be adapted to form an enclosure such as a reservoir, a filter, a pump element or any other receptacle which must be fluid-tightly closed but easy to open by separation of the two members.

The joint according to the invention has a constant cross-section along its entire length and includes : a median part in the form of a circular crown adapted to be intercalated between the respective beads of the two members; a flange at the inner periphery of the median part, said flange being adapted to bear against the inner surface of the wall of one member; and first and second lips at at the outer periphery of the median part, the first lip being rounded to closely fit around the bead of said one member, and the second lip being of lesser thickness than the first and including a rounded portion adapted to fit around a part of the bead of the other member and a terminal skirt portion adapted to resiliently bear against the outer surface of the wall of said other member in the proximity of its bead.

Figure 2:
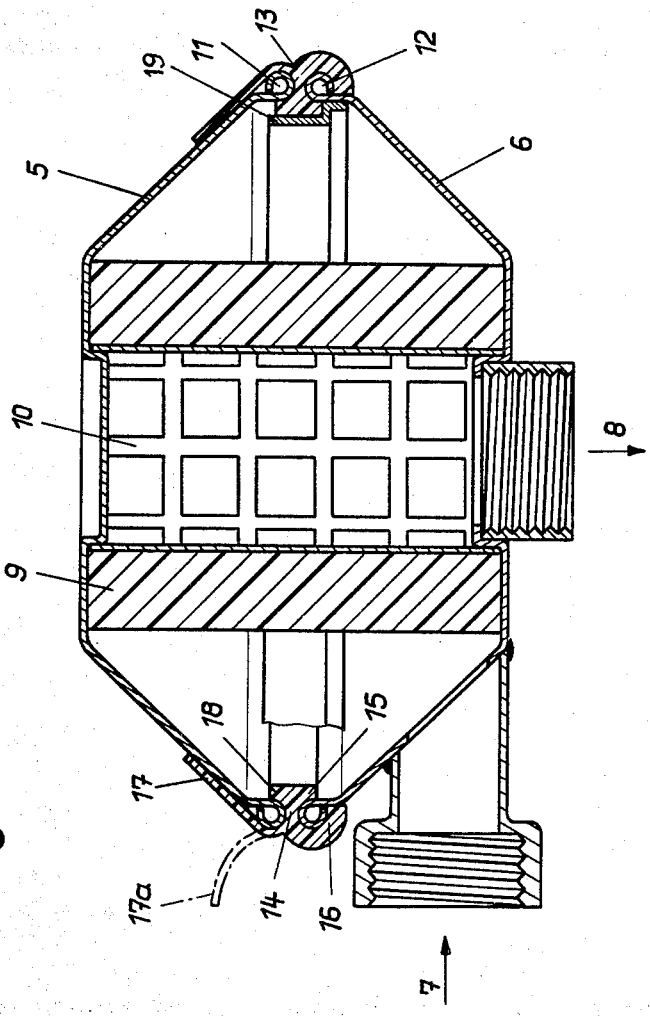

The characteristics and advantages of two embodiments of the joint according to the invention are set out in the following description made by way of example and with reference to the accompanying drawings, in which:

FIG. 1 is a cross-section of part of a first embodiment of joint according to the invention; and FIG. 2 is a cross-section of a vacuum filter incorporating a second embodiment of joint.

The joint shown in FIG. 1 comprises a median part 1 in the form of a circular crown. This median part 1 is extended at its inner periphery by a flange 2 and at its entire outer periphery by two oppositely-directed rounded lips 3 and 4. The first lip 3 has a substantially constant thickness equal to that of the central part 1, and is curved over by about 180° in a manner to form, with the central part 1 and flange 2, a peripheral annular cavity. The second lip 4, of lesser thickness than the central part 1 and lip 3, includes a portion which is curved over by about 135° and which is extended by a terminal skirt portion of generally trunco-conical form.

The filter shown in FIG. 2 includes two dished round members 5 and 6, a base member 6 having an inlet orifice 7 and an outlet orifice 8 for fluid to be filtered, and member 5 serving as cover. Between these two members is held a filtering element 9 supported by a grid 10.

The trunco-conical walls of members 5 and 6 terminate with openings provided with toric beads 11 and 12 respectively, the bead 12 of member 6 coming to fit in the annular cavity of a closure joint 13, the median part 14 of this joint being intercalated between the beads 11 and 12, with a flange 15 bearing against the inner surface of the wall of member 6, and a lip 16 surrounding the bead 12 of this same member 6.

For certain applications, notably for vacuum filters with a diameter greater than 250 mm, it is recommended to place an annular guide 19 to ensure centring of the assembly and to avoid any lateral sliding of member 5 in relation to member 6.

A second lip 17 of joint 13 surrounds the bead 11 of member 5 and comes to bear against the outer surface of the wall of this member.

The joint 13 used in this filter has a second internal flange 18 symmetrically disposed, in relation to the plane of the joint, to the first flange 15, and which comes to bear against the inner surface of the wall of the member 5.

The narrow lip 17 of the joint advantageously has a sufficient flexibility to enable it to be folded out to the shape indicated by 17a (FIG. 2) in a manner to enable removal of the cover-forming member 5. The thickness of the central part 14 and of the thicker lip 16, as well as the presence of the flange 15, ensure that during lifting off of the cover member 5, the joint 13 remains mounted on the base member 6, which facilitates fitting the assembly together again.

In the above-described example, the two members of the filter have toric beads formed by rolling the sheet metal forming the walls. Of course, the beads could be formed by any other suitable process, for example by welding a cylindrical rod of appropriate diameter about the periphery of the opening.

The shape of the members is not necessarily exactly circular but can be polygonal providing that the angles are sufficiently rounded off.

The joints according to the invention are preferably manufactured in an easily mouldable material having a sufficient flexibility, such as synthetic rubber which also has an excellent resistance to common gases and hydrocarbons as well as good mechanical characteristics over a period of time.

Of course, the joint shown in FIG. 1 could be used to sealably join a filter of the type shown in FIG. 2.

What is claimed is:

1. In an assembly of first and second generally round members each having a wall terminating with an opening provided with an annular bead wherein the two beads define superimposable surfaces forming a joining plane, a flexible annular joint sealably joining the first and second members together, said joint having a constant cross-section along its entire length and including: a median part in the form of a circular crown adapted to be intercalated between the respective beads of the two members; a flange at the inner periphery of the median part, said flange being adapted to bear against the inner surface of the wall of the first member; and first and second lips at the outer periphery of the median part, the first lip being rounded to closely fit around the bead of said first member, and the second lip being of lesser thickness than the first and including a rounded portion adapted to fit around a part of the bead of said second member and a terminal skirt portion adapted to resiliently bear against the outer surface of the wall of said second member in the proximity of its bead, a second flange at the inner periphery of the median part adapted to bear against the inner surface of the wall of said second member, said second lip being sufficiently thin and flexible to permit removal of said second member, by outwardly folding the second lip, while the joint remains fitted on said first member, said second lip bearing conically against said second member, so that the joint is vacuum tight.

* * * * *